United States Patent
Huang et al.

(10) Patent No.: US 10,730,222 B2
(45) Date of Patent: Aug. 4, 2020

(54) DIE ASSEMBLY FOR PRODUCING A FILM

(71) Applicant: Dow Global Technologies LLC, Midland, MI (US)

(72) Inventors: Wenyi Huang, Midland, MI (US); Jeffrey D. Wenzel, Saginaw, MI (US); Jie Feng, Midland, MI (US); Robert E. Wrisley, Clare, MI (US); Hyunwoo Kim, Midland, MI (US); Kurt A. Koppi, Midland, MI (US); Scott R. Kaleyta, Saginaw, MI (US); Thomas J. Parsons, Midland, MI (US); Nicolas Cardoso Mazzola, Jundiai (BR); Harpreet Singh, Pearland, TX (US)

(73) Assignee: Dow Global Technologies LLC, Midland, MI (US)

(*) Notice: Subject to any disclaimer, the term of this patent is extended or adjusted under 35 U.S.C. 154(b) by 435 days.

(21) Appl. No.: 15/639,106

(22) Filed: Jun. 30, 2017

(65) Prior Publication Data

US 2019/0001546 A1    Jan. 3, 2019

(51) Int. Cl.
*B32B 27/30* (2006.01)
*B29C 48/30* (2019.01)
(Continued)

(52) U.S. Cl.
CPC .............. *B29C 48/30* (2019.02); *B29C 48/07* (2019.02); *B29C 48/08* (2019.02); *B29C 48/11* (2019.02); *B29C 48/19* (2019.02); *B29C 48/20* (2019.02); *B29C 48/21* (2019.02); *B29C 48/255* (2019.02); *B29C 48/305* (2019.02); *B29C 48/307* (2019.02); *B29C 48/865* (2019.02); *B32B 27/306* (2013.01); *B32B 27/32* (2013.01);
(Continued)

(58) Field of Classification Search
CPC ..... B29C 48/865; B29C 48/21; B29C 48/255; B29C 48/305; B29C 48/30; B29C 48/307; B29C 48/07; B29C 48/08; B29C 48/19; B29C 48/20; B29C 48/11; B32B 27/34; B32B 27/32; B32B 27/306; B32B 27/365; B29L 2031/756; B29L 2031/002
USPC ............................................... 425/465, 133.5
See application file for complete search history.

(56) References Cited

U.S. PATENT DOCUMENTS 3,782,873 A      1/1974  Lynnknowles
3,797,987 A *    3/1974  Marion ................... B32B 27/08
                                                    425/463
(Continued)

*Primary Examiner* — Seyed Masoud Malekzadeh
(74) *Attorney, Agent, or Firm* — Quarles & Brady LLP

(57) ABSTRACT

The present disclosure provides a die assembly for producing a microcapillary film. The die assembly includes a first die plate, a second die plate, a plurality of multi-jackbolt tensioners connecting the first die plate to the second die plate, a manifold, and a plurality of nozzles. The manifold is located between the pair of die plates and defines a plurality of film channels therebetween. The plurality of film channels converge into an elongate outlet, wherein a thermoplastic material is extrudable through the plurality of film channels and the elongate outlet to form a microcapillary film. The plurality of nozzles are located between the plurality of film channels. The plurality of nozzles are operatively connected to a source of channel fluid for emitting the channel fluid between layers of the microcapillary film, whereby a plurality of microcapillary channels are formed in the microcapillary film.

15 Claims, 11 Drawing Sheets

(51) Int. Cl.
*B29C 48/305* (2019.01)
*B29C 48/07* (2019.01)
*B29C 48/08* (2019.01)
*B29C 48/19* (2019.01)
*B29C 48/20* (2019.01)
*B29C 48/21* (2019.01)
*B29C 48/86* (2019.01)
*B29C 48/11* (2019.01)
*B29C 48/255* (2019.01)
*B32B 27/32* (2006.01)
*B32B 27/34* (2006.01)
*B32B 27/36* (2006.01)
*B29L 7/00* (2006.01)
*B29L 31/00* (2006.01)

(52) U.S. Cl.
CPC ............ *B32B 27/34* (2013.01); *B32B 27/365* (2013.01); *B29L 2007/002* (2013.01); *B29L 2031/756* (2013.01)

(56) References Cited

U.S. PATENT DOCUMENTS

| | | | |
|---|---|---|---|
| 3,860,383 A | 1/1975 | Sirevicius | |
| 3,877,857 A * | 4/1975 | Melead | B29C 48/30 425/133.5 |
| 3,940,221 A * | 2/1976 | Nissel | B29C 48/30 425/141 |
| 4,161,385 A * | 7/1979 | Goldstein | B29C 48/30 425/462 |
| 4,252,519 A * | 2/1981 | Farmer | B29C 48/30 425/466 |
| 4,281,980 A * | 8/1981 | Hoagland | B29C 48/30 425/461 |
| 4,281,981 A * | 8/1981 | Feldman | B29C 48/30 425/467 |
| 4,332,543 A * | 6/1982 | Fulton | B29C 48/30 425/461 |
| 4,514,348 A | 4/1985 | Iguchi et al. | |
| 5,067,432 A * | 11/1991 | Lippert | B05C 5/0262 118/413 |
| 5,208,047 A | 5/1993 | Cloeren et al. | |
| 5,401,454 A | 3/1995 | Mendel | |
| 5,679,383 A | 10/1997 | Ryan et al. | |
| RE38,056 E | 4/2003 | Van Dun | |
| 6,626,206 B1 * | 9/2003 | Ulcei | B29C 48/865 137/606 |
| 8,641,946 B2 | 2/2014 | Mackley et al. | |
| 2003/0080462 A1 | 5/2003 | Nordgren et al. | |
| 2008/0018022 A1 * | 1/2008 | Gregg | B29C 48/30 264/323 |
| 2008/0018026 A1 * | 1/2008 | Gregg | B29C 43/22 264/519 |
| 2008/0020182 A1 * | 1/2008 | Gregg | B29C 48/30 428/156 |
| 2009/0011182 A1 | 1/2009 | Mackley et al. | |
| 2011/0020574 A1 | 1/2011 | Mackley et al. | |
| 2011/0049038 A1 | 3/2011 | Aerts et al. | |
| 2013/0288016 A1 | 10/2013 | Koopmans et al. | |
| 2014/0072776 A1 | 3/2014 | Zalamea et al. | |
| 2014/0113112 A1 | 4/2014 | Koopmans et al. | |
| 2015/0321407 A1 | 11/2015 | Dooley et al. | |
| 2015/0321409 A1 | 11/2015 | Dooley et al. | |
| 2017/0087759 A1 | 3/2017 | Huang et al. | |

* cited by examiner

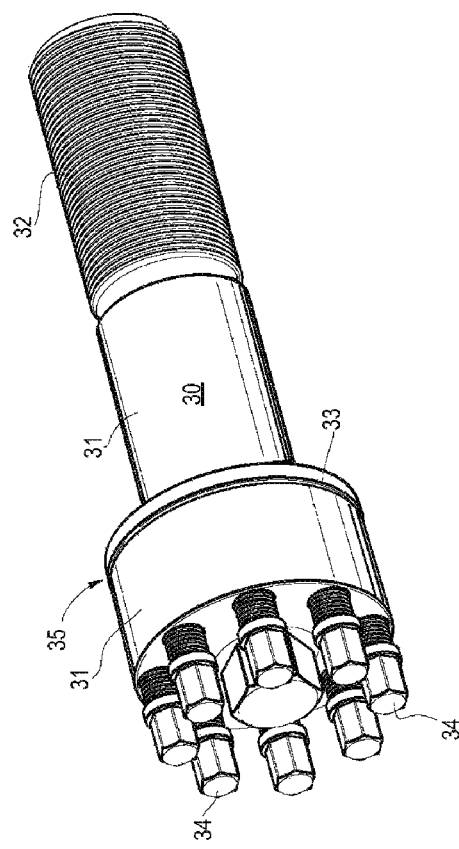

DIE ASSEMBLY FOR PRODUCING A FILM

BACKGROUND

The present disclosure is directed to a die assembly for producing a film.

Stand up pouches (SUPS) formed from film have been gaining market acceptance over rigid packaging in many applications, including food, home and personal care applications. Stand up pouches offer the advantage of lower weight, better use of materials, good visual appeal (direct printing instead of using labels), and better overall sustainability. Nevertheless, SUPS' commercial utilization is limited due lack of specific functionalities, including product flow control, such as when the user requires a "spray" or "aspersion" dispensing from the packaging. This is a common feature required in household and automotive cleaners, disinfectants, glass cleaners, liquid waxes; personal care items such as lotions and sun blocks; and food products such as salad dressings and sauces. In most cases, when a fine spray dispensing is required, a rigid packaging with a specialized nozzle, or a complex trigger pump spray system which is very high cost and limits the application of such packaging, is typically required.

Microcapillary films are low cost alternatives to allow the user to obtain the spray or aspersion dispensing with a minimal increment in cost. To integrate a microcapillary film into a SUP, lamination is typically performed, which requires uniform film thickness. However, the conventional die assemblies with which microcapillary films are formed are known to produce microcapillary films with high variation in film thickness (i.e., films with non-uniform thickness).

A need exists for a die assembly capable of forming a microcapillary film with low variation in film thickness.

SUMMARY

The present disclosure provides a die assembly for producing a microcapillary film. The die assembly contains:
 a first die plate and a second die plate;
 a plurality of multi-jackbolt tensioners connecting the first die plate to the second die plate;
 a manifold located between the pair of die plates and defining a plurality of film channels therebetween, the plurality of film channels converging into an elongate outlet, wherein a thermoplastic material is extrudable through the plurality of film channels and the elongate outlet to form a microcapillary film; and
 a plurality of nozzles located between the plurality of film channels, the plurality of nozzles operatively connected to a source of channel fluid for emitting the channel fluid between layers of the microcapillary film whereby a plurality of microcapillary channels are formed in the microcapillary film.

BRIEF DESCRIPTION OF THE DRAWINGS

FIG. 8A is a perspective view of a multi-jackbolt tensioner in accordance with an embodiment of the present disclosure.

DEFINITIONS AND TEST METHODS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

A "channel fluid" is a flowable substance. Nonlimiting examples of suitable channel fluid include air, gas, and melted polymeric material. A nonlimiting example of a suitable polymeric material is a melted thermoplastic material. In an embodiment, the channel fluid is air or a gas. In an embodiment, the channel fluid excludes polymeric material.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

Density is measured in accordance with ASTM D792, Method B. The result is recorded in grams per cubic centimeter (g/cc).

Figure 11:
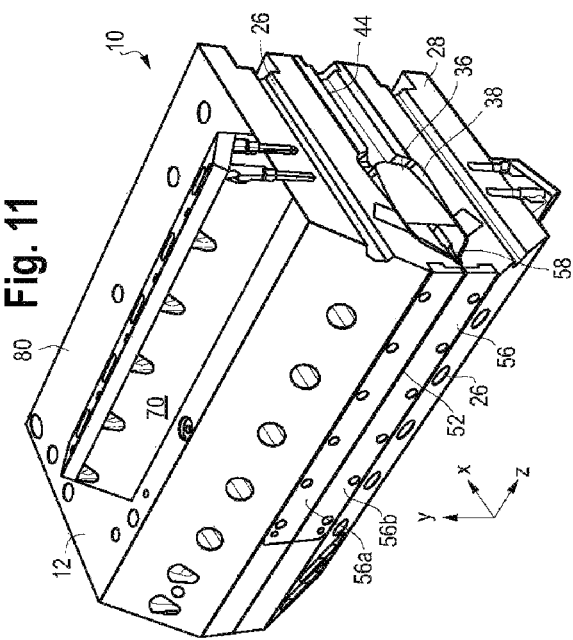
FIG. 11 is a bottom cross-sectional view taken along line Q-Q of FIG. 1, with no cartridge heaters, in accordance with an embodiment of the present disclosure.

The term "horizontal deflection" refers to distortion of the first die plate away from the second die plate along the X axis, as shown in FIG. 11, during extrusion due to the pressure exerted on the inner surface of each die plate from the thermoplastic material.

"Low density polyethylene" (or "LDPE") consists of ethylene homopolymer, or ethylene/α-olefin copolymer comprising at least one $C_3$-$C_{10}$ α-olefin, or $C_3$-$C_4$ α-olefin that has a density from 0.915 g/cc to 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, The Dow Chemical Company (e.g., Dow™ LDPE 501I), and others.

Melt index (MI) (12) in g/10 min is measured using ASTM D-1238-04 (190° C./2.16 kg).

The term "parallel," as used herein, refers to components, surfaces, or openings that extend in the same direction and never intersect.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "thermoplastic material" is a linear or branched polymer which can be repeatedly softened and made flowable when heated and returned to a hard state when cooled to room temperature. It generally has an elastic modulus greater than 10,000 psi (68.95 MPa), as measured in accordance with ASTM D638-72. In addition, thermoplastic materials can be molded or extruded into articles of any predetermined shape when heated to the softened state. Nonlimiting examples of suitable thermoplastic materials include homopolymers and copolymers (including elastomers) of one or more α-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an α-olefin with a conjugated or non-conjugated diene, as typically represented by ethylene-butadiene copolymer and ethylene-ethylidene norbornene copolymer; and polyolefins (including elastomers) such as copolymers of two or more α-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, a methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polyvinylidene fluoride, polymethyl acrylate, and polymethyl methacrylate; polyamides such as nylon 6, nylon 6,6, and nylon 12; thermoplastic polyesters such as polyethylene terephthalate and polybutylene terephthalate; polyurethane, polycarbonate, polyphenylene oxide, and the like; and glassy hydrocarbon-based resins, including poly-dicyclopentadiene polymers and related polymers (copolymers, terpolymers); saturated mono-olefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like; and combinations thereof. A nonlimiting example of a suitable ethylene/α-olefin copolymer is a low density polyethylene (LDPE).

The term "vertical deflection" refers to separation of the first die plate from the second die plate along the Y axis, as shown in FIG. 11, during extrusion due to the pressure exerted on the inner surface of each die plate from the thermoplastic material.

DETAILED DESCRIPTION

The present disclosure provides a die assembly. The die assembly includes a first die plate, a second die plate, a plurality of multi-jackbolt tensioners connecting the first die plate to the second die plate, a manifold, and a plurality of nozzles. The manifold is located between the pair of die plates and defines a plurality of film channels therebetween. The plurality of film channels converge into an elongate outlet, wherein a thermoplastic material is extrudable through the plurality of film channels and the elongate outlet to form a microcapillary film. The plurality of nozzles are located between the plurality of film channels. The plurality of nozzles are operatively connected to a source of channel fluid for emitting the channel fluid between layers of the microcapillary film, whereby a plurality of microcapillary channels are formed in the microcapillary film.

A "die assembly," as used herein, is a multi-component apparatus through which a thermoplastic material flows and is shaped. The die assembly is for producing a film, and further a microcapillary film.

Figure 1:
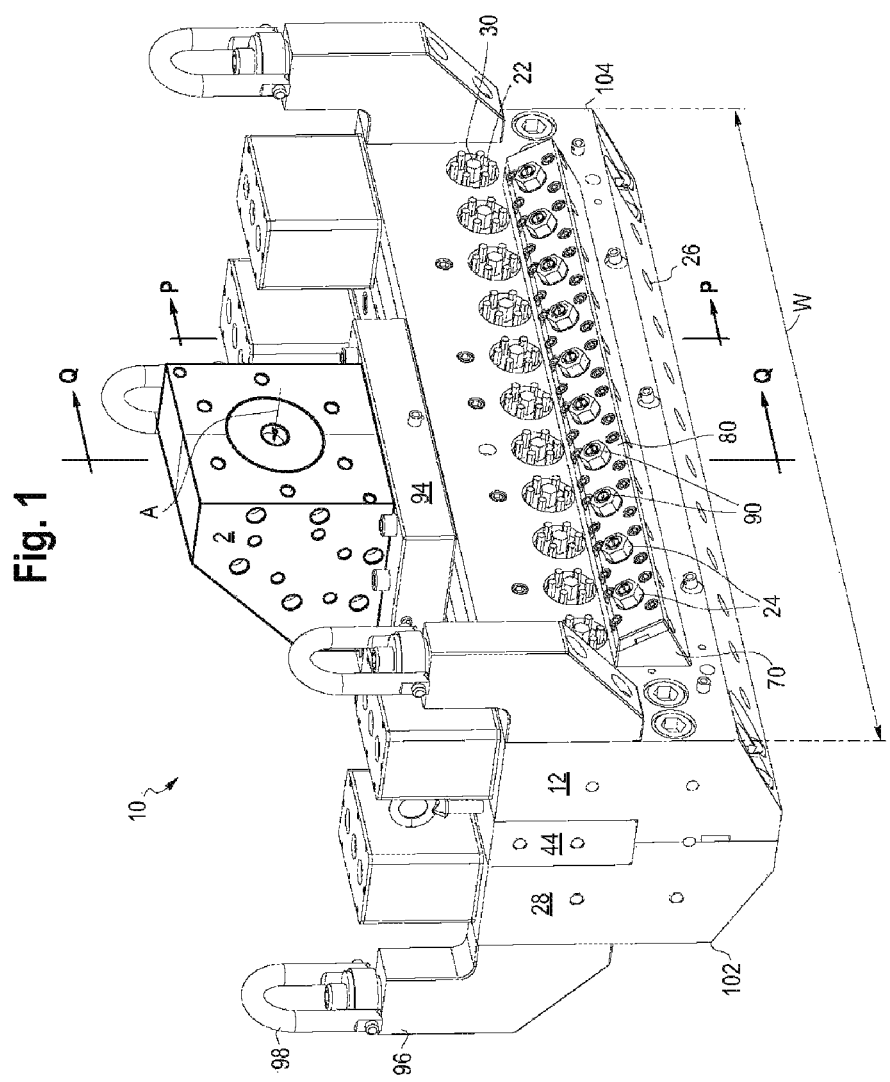
FIG. 1 is a perspective view of a die assembly in accordance with an embodiment of the present disclosure.

In FIG. 1, a die assembly 10 is operatively connected to an extruder 2 having a thermoplastic material passing therethrough. FIG. 1 depicts a portion of an extruder 2 that is operatively connected to the die assembly 10. In an embodiment, the extruder 2 includes a material housing, a material hopper, a screw, and electronics (e.g., controllers, processors, and motors). Nonlimiting examples of suitable extruders 2 include single-screw extruders and twin-screw extruders. A nonlimiting example of a suitable extruder 2 is the extruder described in U.S. Publication No. 2015/0321409, published 12 Nov. 2015, the entire contents of which are herein incorporated by reference.

In an embodiment, the thermoplastic material is placed into the material hopper and passed into the material housing for blending. The thermoplastic material is heated and blended by rotation of the screw rotationally positioned in the housing of the extruder 2. A motor may be provided to drive the screw or other driver to advance the melted thermoplastic material. Heat and pressure are applied from a heat source and a pressure source (e.g., the screw), respectively, to the blended melted thermoplastic material to force the material through the die assembly 10, as indicated by the Arrow A of FIG. 1. The melted thermoplastic material passes through the die assembly 10, and is formed into the desired shape and cross-section.

A. First Die Plate and Second Die Plate

Figure 2:
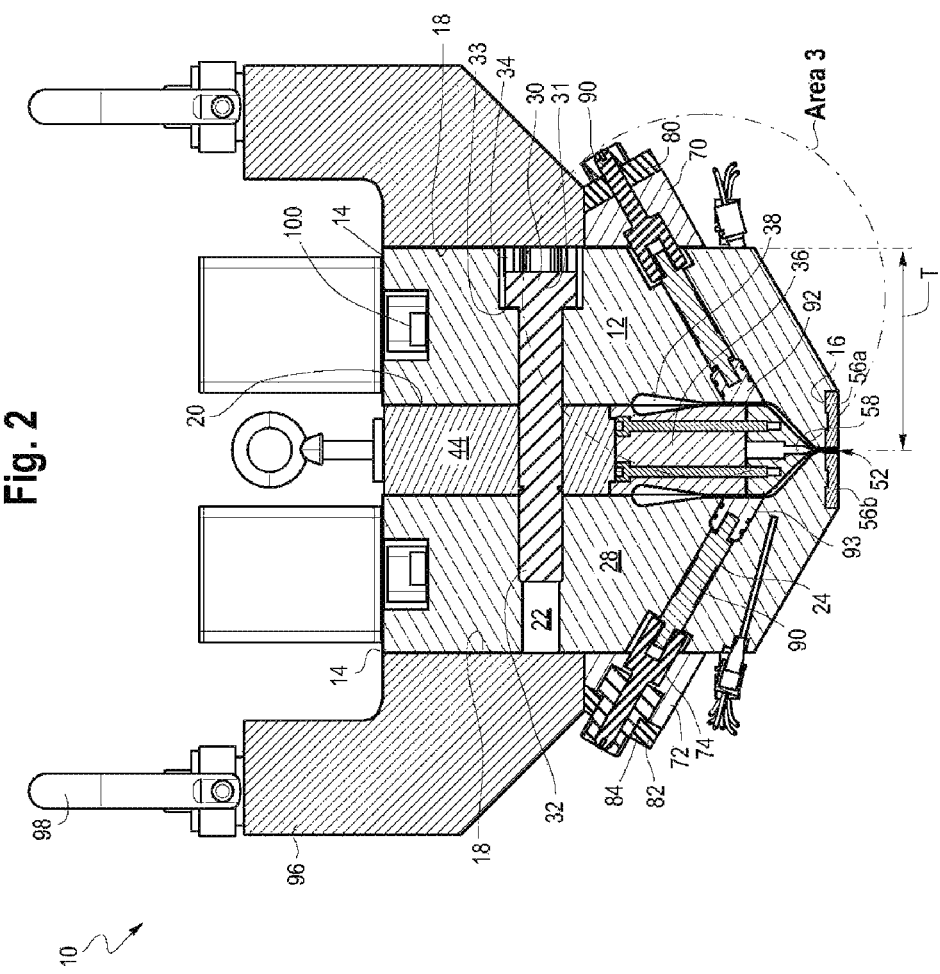
FIG. 2 is a cross-sectional view of the die assembly taken along line P-P of FIG. 1 in accordance with an embodiment of the present disclosure.
Figure 4:
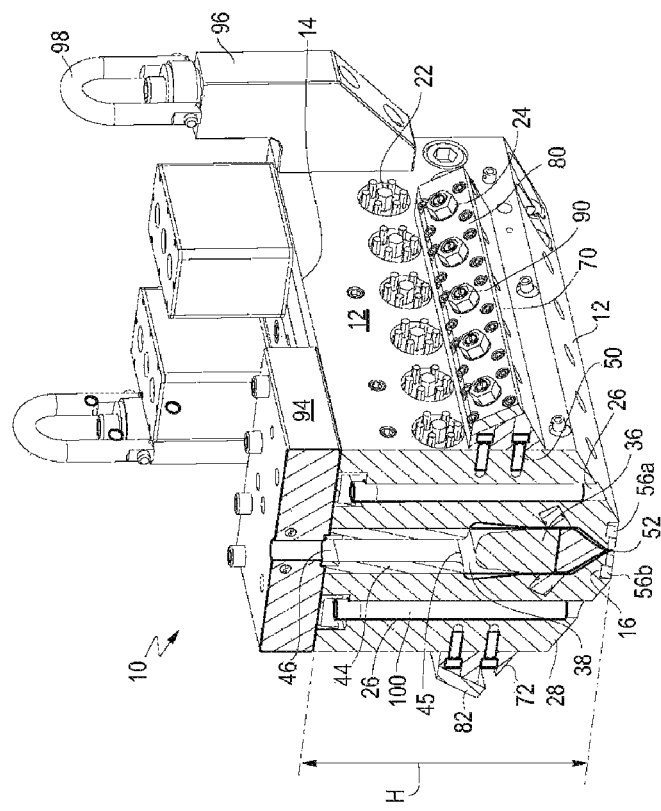
FIG. 4 is a cross-sectional view of the die assembly taken along line Q-Q of FIG. 1 in accordance with an embodiment of the present disclosure.
Figure 5:
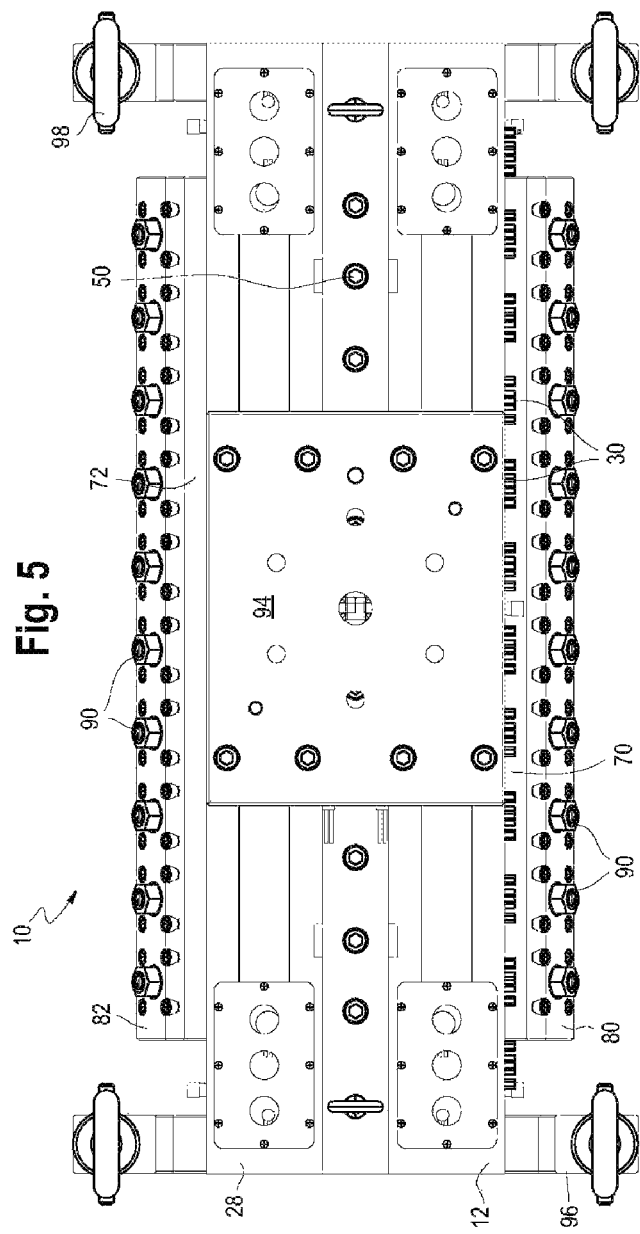
FIG. 5 is a top plan view of a die assembly in accordance with an embodiment of the present disclosure.
Figure 6:
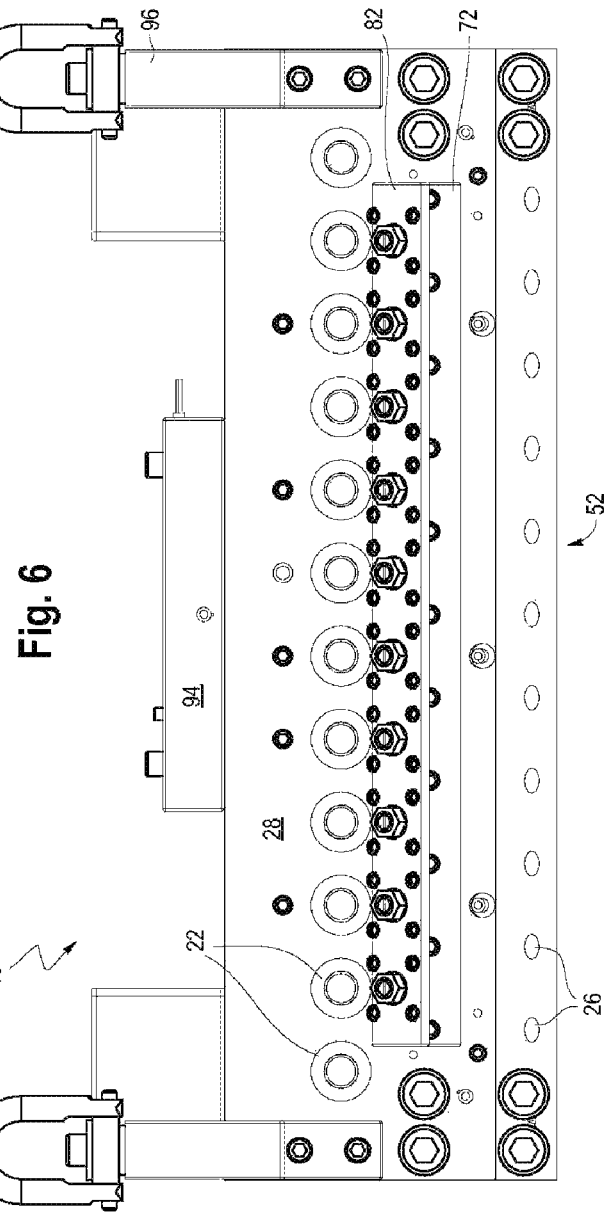
FIG. 6 is a front elevation view of the die assembly a die assembly in accordance with an embodiment of the present disclosure.

The present die assembly includes a first die plate and a second die plate. A "die plate," as used herein, is a rigid structure that defines the body of the die assembly. The pair of die plates includes the first die plate 12 and the second die plate 28, as shown in FIGS. 1, 2 and 4. The first die plate 12 and the second die plate 28 may or may not be mirror images of one another. In an embodiment, the first die plate 12 and the second die plate 28 are mirror images of one another, as shown in FIG. 2. The first die plate 12 and the second die plate 28 are connected via a plurality of multi-jackbolt tensioners.

Figure 3:
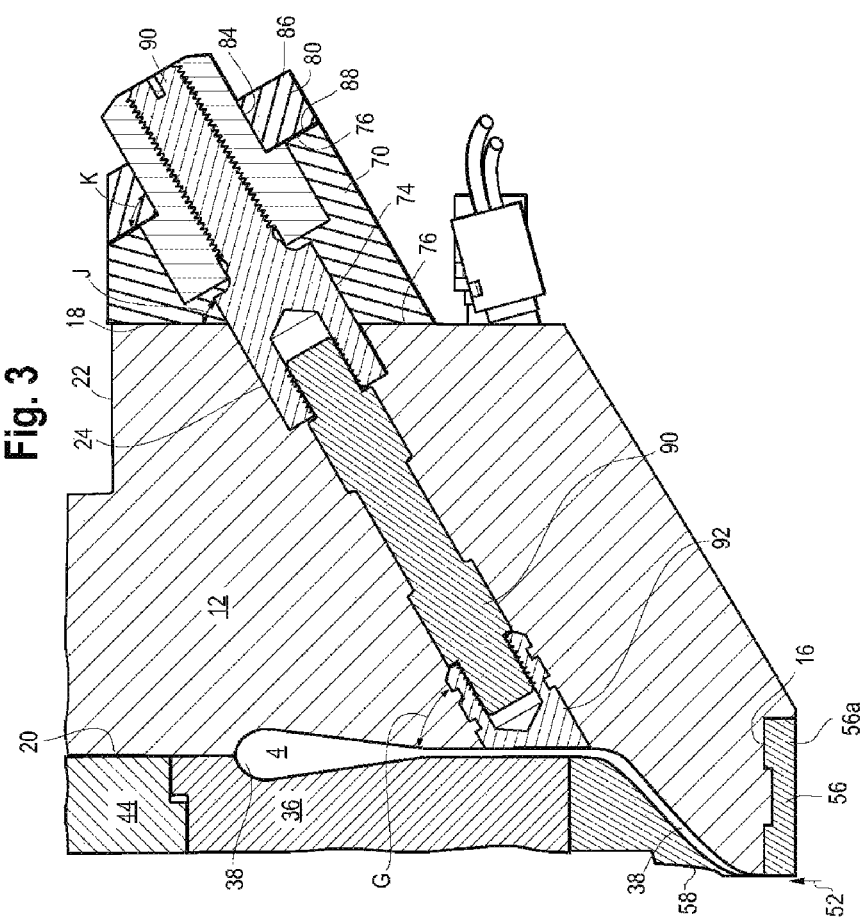
FIG. 3 is an enlarged view of Area 3 of FIG. 2.

Each die plate (12, 28) has a top surface 14, a bottom surface 16, an outer surface 18, and an inner surface 20, as shown in FIGS. 2 and 3.

The first die plate 12 and the second die plate 28 are aligned with one another such that the inner surface 20 of the first die plate 12 is adjacent the inner surface 20 of the second die plate 28. The first die plate 12 and the second die plate 28 are spaced apart such that the melted thermoplastic material 4 may flow between the first die plate 12 and the second die plate 28.

Each die plate (12, 28) has a width, W, as shown in FIG. 1. In an embodiment, the width, W, of each die plate (12, 28) is from 50 cm, or 55 cm, or 60 cm, or 70 cm, or 75 cm, or 80 cm, or 85 cm to 87 cm, or 90 cm, or 100 cm, or 110 cm, or 120 cm, or 150 cm, or 200 cm, or 250 cm. In an embodiment, the width, W, of each die plate (12, 28) is 86.36 cm (34 inches). The width, W, of the first die plate 12 is equal to the width, W, of the second die plate 28.

Each die plate (12, 28) has a thickness, T, as shown in FIG. 2. In an embodiment, the thickness, T, of each die plate (12, 28) is from 7 cm, or 8 cm, or 9 cm, or 10 cm, or 11 cm to 12 cm, or 13 cm, or 14 cm, or 15 cm. In an embodiment, the thickness, T, of each die plate (12, 28) is 11.43 cm (4.5 inches). The thickness, T, of the first die plate 12 is equal to the thickness, T, of the second die plate 28.

Each die plate (12, 28) has a height, H, as shown in FIG. 4. In an embodiment, the height, H, of each die plate (12, 28) is from 20 cm, or 21 cm, or 22 cm, or 23 cm, or 24 cm, or 25 cm to 27 cm, or 30 cm, or 35 cm, or 40 cm, or 50 cm, or 60 cm. In an embodiment, the height, H, of each die plate (12, 28) is 25.4 cm (10 inches). The height, H, of the first die plate 12 is equal to the height, H, of the second die plate 28.

In an embodiment, the each die plate (12, 28) includes:

(a) a plurality of multi-jackbolt openings 22 (FIG. 2);

(b) optionally, a plurality of adjustment openings 24 (FIG. 2); and (c) optionally, a plurality of cartridge heater openings 26 (FIG. 4).

A plurality of multi-jackbolt openings 22 extend through each die plate (12, 28), as shown in FIG. 2. A "multi-jackbolt opening" is a void in a die plate sized and shaped to receive a multi-jackbolt tensioner. Each multi-jackbolt opening 22 extends from the outer surface 18 of a die plate (12, 28) to the inner surface 20 of a respective die plate (12, 28). The multi-jackbolt openings 22 are spaced apart along the width, W, of the die plate (12, 28).

In an embodiment, each multi-jackbolt opening 22 is parallel to one another. FIGS. 1 and 2 depict parallel multi-jackbolt openings 22. In an embodiment, each multi-jackbolt opening 22 extends in the same direction along the thickness, T, of the die plate (12, 28), as shown in FIGS. 1 and 2.

In an embodiment, each multi-jackbolt opening 22 extends parallel to the top surface 14 of the die plate (12, 28), as shown in FIGS. 1 and 2.

In an embodiment, the multi-jackbolt openings 22 are aligned in a linear configuration along the width, W, of the die plate (12, 28), as shown in FIG. 1.

Each multi-jackbolt opening 22 in the first die plate 12 is positioned to align with a multi-jackbolt opening 22 in the second die plate 28, such that a multi-jackbolt tensioner may extend through the first die plate 12 and the second die plate 28, as shown in FIG. 2, thereby connecting the first die plate 12 to the second die plate 28.

In an embodiment, each die plate (12, 28) includes from 2, or 4, or 6, or 8, or 10 to 12, or 14, or 16, or 18, or 20 multi-jackbolt openings 22. In an embodiment, each die plate (12, 28) includes twelve multi-jackbolt openings 22.

In an embodiment, a plurality of adjustment openings 24 extend through each die plate (12, 28), as shown in FIGS. 2 and 3. An "adjustment opening" is a void in a die plate sized and shaped to receive an adjustment assembly. Each adjustment opening 24 extends from the outer surface 18 of a die plate (12, 28) towards the inner surface 20 of the respective die plate (12, 28), but does not extend through the inner surface 20 of respective die plate (12, 18), as shown in FIGS. 2 and 3. In other words, the adjustment openings 24 in the first die plate 12 extend from the outer surface 18 of the first die plate 12 towards the inner surface 20 of the first die plate, but do not extend through the inner surface 20 of the first die plate 12.

In an embodiment, each adjustment opening 24 is parallel to one another. FIGS. 1 and 2 depict parallel adjustment openings 24. In an embodiment, each adjustment opening 24 extends in the same direction along the thickness, T, of the die plate (12, 28), as shown in FIGS. 1 and 2.

In an embodiment, each adjustment opening 24 extends at an angle, G, from the inner surface 20 of the die plate (12, 28), as shown in FIG. 3. In an embodiment, the angle, G, between the inner surface 20 of the die plate (12, 28) and the adjustment opening 24 is from 20°, or 25° to 30°, or 35°, or 40°, or 45°, or 50°, or 60°, or 70°, or 80°, or 90°. In a further embodiment, the angle, G, between the inner surface 20 of the die plate (12, 28) and the adjustment opening 24 is 30°.

The multi-jackbolt openings 22 are positioned above the adjustment openings 24 such that the multi-jackbolt openings 22 and the adjustment openings 24 do not intersect, as shown in FIG. 2.

In an embodiment, each die plate (12, 28) includes from 2, or 4, or 6, or 8, or 10 to 12, or 14, or 16, or 18, or 20 adjustment openings 24. In a further embodiment, each die plate (12, 28) includes ten adjustment openings 24.

In an embodiment, a plurality of cartridge heater openings 26 extend through each die plate (12, 28), as shown in FIG. 4. A "cartridge heater opening" is a void in a die plate sized and shaped to receive a cartridge heater. Each cartridge heater opening 26 extends from the top surface 14 of a die plate (12, 28) to the bottom surface 16 of the respective die plate (12, 28).

Figure 7:
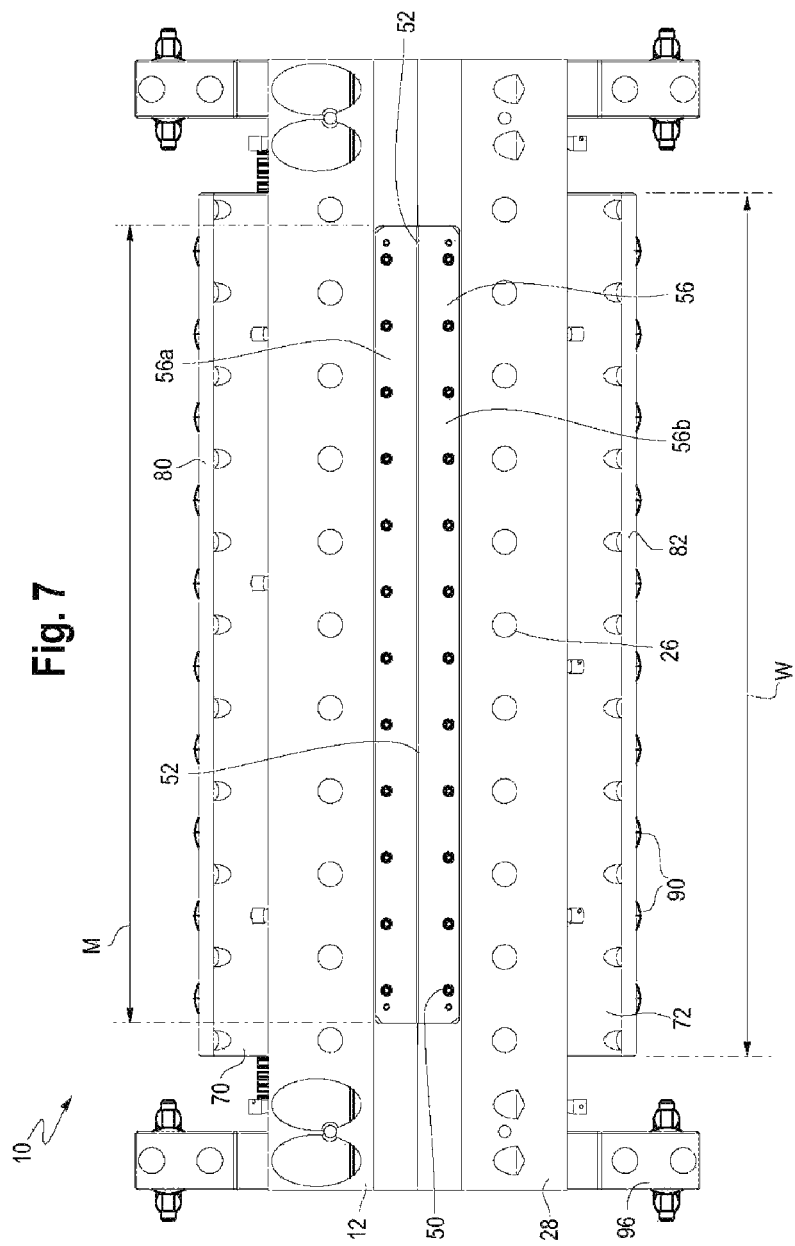
FIG. 7 is a bottom plan view of the die assembly in accordance with an embodiment of the present disclosure.

In an embodiment, each cartridge heater opening 26 is parallel to one another. FIGS. 4 and 7 depict parallel cartridge heater openings 26. Each cartridge heater opening 26 extends in the same direction along the height, H, of the die plate (12, 28), as shown in FIGS. 4 and 7.

The cartridge heater openings 26 are positioned between the multi-jackbolt openings 22 such that the cartridge heater openings 26 and the multi-jackbolt openings 22 do not intersect, as shown in FIG. 4. Further, the cartridge heater openings 26 are positioned between the adjustment openings 24 such that the cartridge heater openings 26 and the adjustment openings 24 do not intersect, as shown in FIG. 4.

In an embodiment, each die plate (12, 28) includes from 2, or 4, or 6, or 8, or 10 to 11, or 12, or 14, or 16, or 18, or 20 cartridge heater openings 26. In a further embodiment, each die plate (12, 28) includes twelve cartridge heater openings 26.

The first die plate 12 may comprise two or more embodiments disclosed herein.

The second die plate 28 may comprise two or more embodiments disclosed herein.

B. Multi-Jackbolt Tensioners

The present die assembly includes a plurality of multi-jackbolt tensioners.

A "multi-jackbolt tensioner" is a bolt structure including a main bolt, a plurality of jackbolts, a washer, and a bolt body. The "bolt body" is a rigid structure with threads engaged with the plurality of jackbolts. The bolt body and the main bolt may or may not be integral. In an embodiment, the bolt body and the main bolt are integral such that the main bolt is an extension of the bolt body. In another embodiment, the bolt body and the main bolt are separate components and the bolt body is connected to the main bolt, such as by engaging with threads of the main bolt. In an embodiment, the main bolt extends through, or partially through, the center of the bolt body and is connected to the bolt body. The washer surrounds, or encircles, the bolt body.

A "jackbolt" is a rotatable structure with threads engaged with the bolt body, the jackbolt capable of exerting a force on the washer. The jackbolts are axially arranged around the circumference of the bolt body. Each jackbolt extends through the bolt body and has two opposing ends, including a first end that is sized and shaped such that a user may rotate the jackbolt (such as with a wrench), and a second end that is in contact with the washer. As a jackbolt is rotated in a tightening fashion (in contrast to a loosening fashion), the second end of the jackbolt exerts a force on the washer, thereby separating the bolt body from the washer to form a gap between the bolt body and the washer. When the multi-jackbolt tensioner is positioned within a die plate (12, 28), the washer is in contact with the outer surface 18 of the die plate (12, 28). As a jackbolt is rotated in a tightening fashion, the second end of the jackbolt exerts a force on the washer, which in turn exerts a force on the outer surface 18 of the die plate (12, 28). A gap is formed between the washer and the bolt body. Because the main bolt is connected to the bolt body, the bolt body pulls the main bolt as the bolt body separates from the washer (as the jackbolt is tightened).

A nonlimiting example of a suitable multi-jackbolt tensioner 30 is provided in FIG. 8A. The multi-jackbolt tensioner 30 of FIG. 8A includes a main bolt 32, a plurality of jackbolts 34, a washer 33, and a bolt body 31. The bolt body 31 has threads engaged with the main bolt 32 and threads engaged with the plurality of jackbolts 34. The washer 33 surrounds the bolt body 31. The main bolt 32 extends through, or partially through, the center of the bolt body 31 and is connected to the bolt body 31. Each jackbolt 34 has threads engaged with the bolt body 31 and is capable of exerting a force on the washer 33. The jackbolts 34 are axially arranged around the circumference of the bolt body 31. Each jackbolt 34 extends through the bolt body 31 and has two opposing ends, including a first end that is sized and shaped such that a user may rotate the jackbolt 34 (such as with a wrench), and a second end that is in contact with the washer 33. As a jackbolt 34 is rotated in a tightening fashion, the second end of the jackbolt 34 exerts a force on the washer 33, thereby separating the bolt body 31 from the washer 33 to form a gap 35 between the bolt body 31 and the washer 33.

FIG. 2 shows a multi-jackbolt tensioner 30 positioned to extend from the outer surface 18 of the first die plate 12 through the first die plate 12 and the second die plate 28, such that threads of the main bolt 32 are engaged with the second die plate 28 and the washer 33 is in contact with the outer surface 18 of the die plate. As one or more jackbolts 34 are rotated in a tightening fashion, the second end of the tightened jackbolt 34 exerts a force on the washer 33, which in turn exerts a force on the outer surface 18 of the first die plate 12. A gap 35 is formed between the washer 33 and the bolt body 31. Because the main bolt 32 is connected to the bolt body 31, the bolt body 31 pulls the main bolt 32 as the bolt body 31 separates from the washer 33 (as the jackbolt 34 is tightened). Because the threads of the main bolt 32 are engaged with the second die plate 28, the second die plate 28 is pulled in the same direction as the main bolt 32. Consequently, as the washer 33 exerts a force on the outer surface of the first die plate 12, the main bolt 32 and the second die plate 28 each is pulled towards the outer surface of the first die plate 12. Thus, the plurality of multi-jackbolt tensioners 30 connect the first die plate 12 to the second die plate 28.

In an embodiment, the multi-jackbolt tensioner 30 includes a main bolt 32 and eight jackbolts 34, as shown in FIG. 8A.

In an embodiment, the multi-jackbolt tensioner 30 is a SUPERBOLT™ bolt-style tensioner, available from Nord-Lock, Inc.

The plurality of multi-jackbolt tensioners 30 connect the first die plate 12 to the second die plate 28. Each multi-jackbolt tensioner 30 extends through a multi-jackbolt opening 22 in the first die plate 12 and a corresponding multi-jackbolt opening 22 in the second die plate 28, as shown in FIG. 2.

The number of multi-jackbolt openings 22 in each die plate (12, 28) is equal to the number of multi-jackbolt tensioners 30 included in the die assembly 10. In an embodiment, the die assembly includes twelve multi-jackbolt tensioners 30.

Applicant surprisingly found that connecting the first die plate to the second die plate with a plurality of multi-jackbolt tensioners 30 reduces the vertical deflection and/or horizontal deflection of the die assembly 10. Vertical deflection and horizontal deflection are problematic in conventional die assemblies because they result in variation in film thickness. The torque required to tighten a conventional bolt exponentially increases as the diameter of the conventional bolt increases. Multi-jackbolt tensioners 30 enable easy application of high tensional forces on large main bolts 32 compared to conventional bolts having the same diameter as the main bolt 32 because the diameter of the single jackbolt 34 is less than the diameter of said conventional bolt. In other words, less torque is required to tighten a single jackbolt 34 of a multi-jackbolt tensioner 30 than a conventional bolt having the same diameter as the main bolt 32 of the multi-jackbolt tensioner 30. The multi-jackbolt tensioners 30 further enable precise and uniform application of preloading on the die plates (12, 28). The preloading counters the deflection force exerted by the melt flow of the thermoplastic material 4 between the two die plates (12, 28). This results in decreased vertical deflection and/or decreased horizontal deflection of the die plates (12, 28) during extrusion of the microcapillary film 54.

The multi-jackbolt tensioners 30 may comprise two or more embodiments disclosed herein.

C. Manifold

The present die assembly includes a manifold.

The manifold 36 is located between the pair of die plates (12, 28) and defines a plurality of film channels 38 therebetween, as shown in FIGS. 2, 3, and 4.

Figure 8:
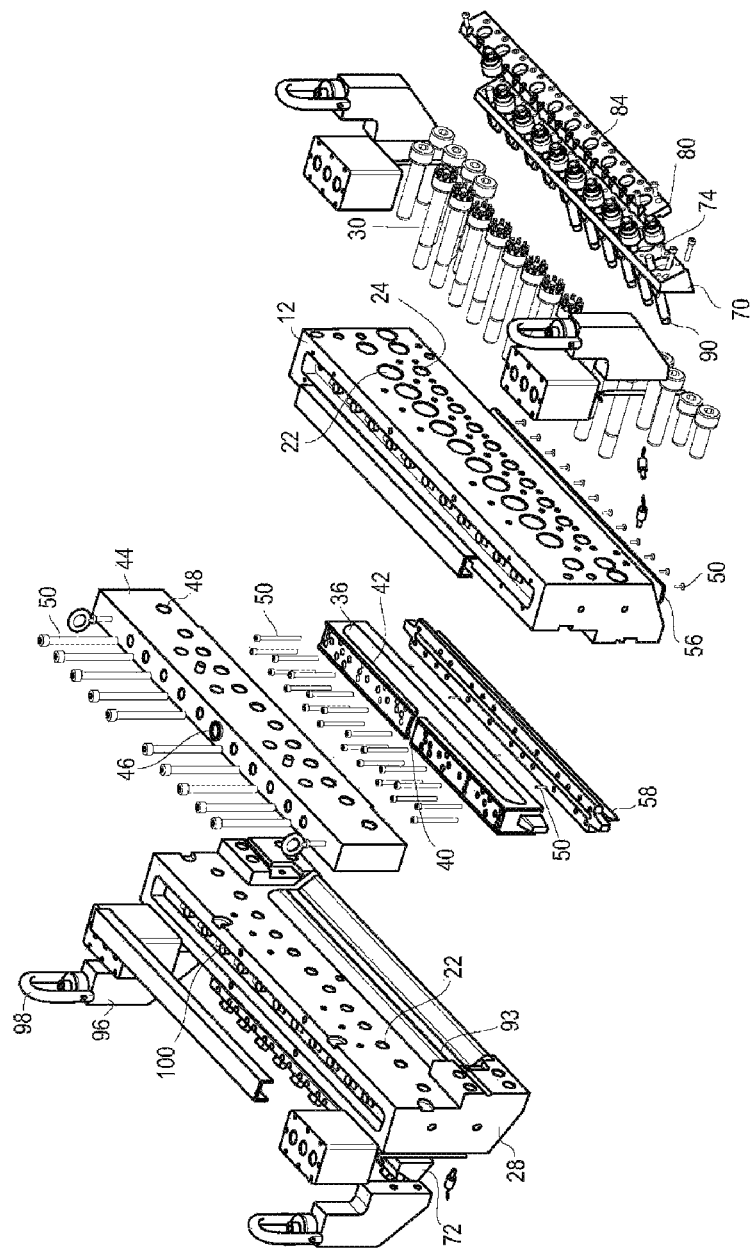
FIG. 8 is an exploded view of the die assembly in accordance with an embodiment of the present disclosure.
Figure 9:
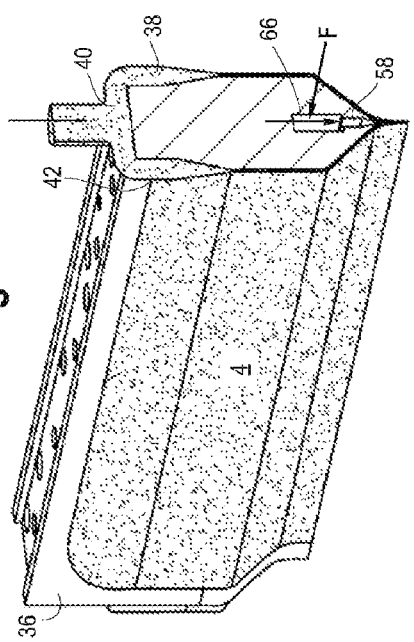
FIG. 9 is a perspective cross-sectional view of a manifold in accordance with an embodiment of the present disclosure.

The manifold 36 includes a manifold intake 40 and a manifold outtake 42, as shown in FIG. 8. Thermoplastic material 4 flows through the manifold intake 40, out the manifold outtake 42, and into the plurality of film channels 38, as shown in FIG. 9. As the thermoplastic material 4 flows between the manifold 36 and the die plates (12, 28) within the film channels 38, the thermoplastic material 4 exerts a pressure on the inner surface 20 of each die plate (12, 28).

In an embodiment, the die assembly 10 includes a manifold spacer 44, as shown in FIGS. 2 and 8. The manifold spacer 44 is located between the pair of die plates (12, 28) and above the manifold 36.

The manifold spacer 44 includes a manifold spacer intake 46 and a manifold spacer outtake 45, as shown in FIG. 4. FIG. 8 depicts a manifold spacer 44 with a manifold spacer intake 46. The manifold spacer intake 46 is positioned to align with the manifold intake 40.

Figure 12:
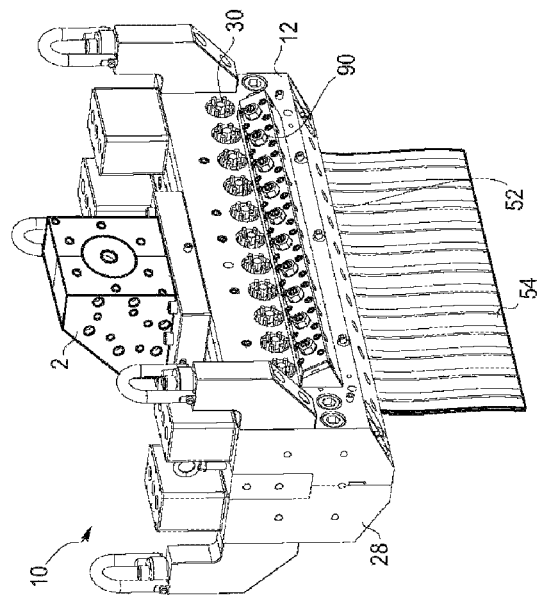
FIG. 12 is a perspective view of a die assembly and microcapillary film in accordance with an embodiment of the present disclosure.

In FIG. 3, thermoplastic material 4 flows into the manifold spacer intake 46, through the manifold spacer 44, and out the manifold spacer outtake 45 into the manifold intake 40. In an embodiment, thermoplastic material 4 (FIG. 3) flows from the extruder 2 (FIG. 1) into the manifold spacer intake 46 (FIG. 4), through the manifold spacer 44 (FIG. 4), out the manifold spacer outtake 45 (FIG. 4), into the manifold intake 40 (FIG. 8), out the manifold outtake 42 (FIG. 9) into the film channels 38 (FIG. 2) and out the elongate outlet 52 (FIG. 2) to form a microcapillary film 54 (FIG. 12).

A plurality of manifold spacer multi-jackbolt openings 48 extend through the manifold spacer 44, as shown in FIG. 8.

In an embodiment, each manifold spacer multi-jackbolt opening 48 is parallel to one another. FIGS. 2 and 8 depict parallel manifold spacer multi-jackbolt openings 48.

Each manifold spacer multi-jackbolt opening 48 is positioned to align with a multi-jackbolt opening 22 in the first die plate 12 and a multi-jackbolt opening 22 in the second die plate 28, such that a multi-jackbolt tensioner extends through the first die plate 12, the manifold spacer 44, and the second die plate 28, as shown in FIG. 2, thereby connecting the first die plate 12 to the manifold spacer 44 and the second die plate 28.

The manifold spacer 44 and each die plate (12, 28) includes the same number of multi-jackbolt openings (22, 48). In an embodiment, the manifold spacer 44 includes twelve manifold spacer multi-jackbolt openings 48.

In an embodiment, the manifold spacer 44 is connected to the manifold 36 via a plurality of fasteners 50, as shown in FIG. 8.

The manifold 36 and the manifold spacer 44 may comprise two or more embodiments disclosed herein.

D. Elongate Outlet

FIG. 2 shows the plurality of film channels 38 converge into an elongate outlet 52. The thermoplastic material 4 is extrudable through the plurality of film channels 38 and the elongate outlet 52 to form a microcapillary film 54, as shown in FIGS. 2, 3, and 12.

The elongate outlet 52 extends along at least a portion of the width, W, of the die plates (12, 28), as shown in FIG. 7. The elongate outlet 52 is positioned below the manifold 36 and is defined by a gap between the first die plate 12 and the second die plate 28, as shown in FIG. 2.

The elongate outlet 52 has a width, M, as shown in FIG. 7. In an embodiment, the width, M, of the elongate outlet 52 is from 50 cm, or 55 cm, or 56 cm, or 57 cm, or 58 cm, or 59 cm, or 60 cm to 61 cm, or 62 cm, or 63 cm, or 64 cm, or 65 cm, or 70 cm, or 100 cm, or 150 cm, or 200 cm. In an embodiment, the width, M, of the elongate outlet 52 is 60.96 cm (24 inches). In another embodiment, the width, M, of the elongate outlet 52 is 152.40 cm (60 inches).

In an embodiment, FIG. 7 shows a plurality of outlet plates 56 (56a, 56b) are connected to the bottom surface 16 of each die plate (12, 28). FIG. 7 depicts the die assembly 10 with a pair of outlet plates 56 (56a, 56b), wherein the first outlet plate 56a is attached to the bottom surface 16 of the first die plate 12, and the second outlet plate 56a is attached to the bottom surface 16 of the second die plate 28. The elongate outlet 52 is located between the pair of outlet plates 56 (56a, 56b). The outlet plates (56a, 56b) are connected to the die plate (12, 28) with a plurality of fasteners 50. The extent of the opening (i.e., the distance of the opening) of the elongate outlet 52 may be adjusted by positioning the outlet plates 56 (56a, 56b) closer to one another, or further apart from one another. The extent of the opening of the elongate outlet may also be adjusted by varying the shape of the outlet plates 56 (56a, 56b) (e.g., by using an arcuate outlet plate).

The elongate outlet 52 may comprise two or more embodiments disclosed herein.

E. Plurality of Nozzles

The present die assembly includes a plurality of nozzles.

Figure 10:
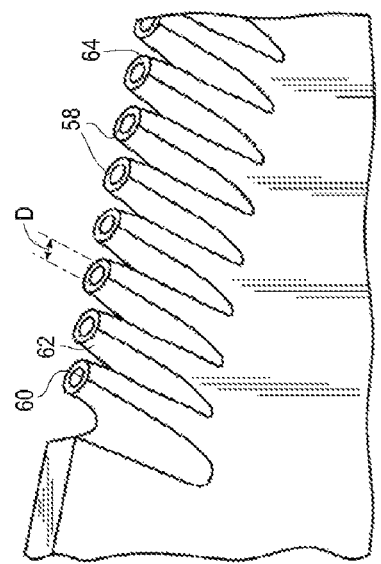
FIG. 10 is an enlarged view of a plurality of nozzles in accordance with an embodiment of the present disclosure.

A "nozzle" refers to a structure with a fluid channel, the structure having a tapered outer surface that extends to a nose. A "fluid channel" is an elongated void through which a channel fluid may flow. FIG. 10 depicts a plurality of nozzles 58, each nozzle 58 having a fluid channel 60 and a tapered outer surface 62 that extends to a nose 64. FIG. 2 shows the plurality of nozzles 58 positioned between the plurality of film channels 38, below the manifold 36, and above the elongate outlet. The plurality of nozzles 58 are positioned between the first die plate 12 and the second die plate 28, as shown in FIG. 2.

The nozzles 58 may or may not be integral with one another. FIGS. 8 and 10 depict a plurality of nozzles 58 that are integral. In other words, the nozzles 58 are formed from a single structure.

A fluid channel 60 extends through each nozzle 58 such that channel fluid 68 may flow through the fluid channel 60 and out the nose 64, as shown by Arrow F of FIG. 9. The nose 64 is adjacent the elongate outlet 52. FIG. 9 depicts a plurality of nozzles 58 arranged in a linear configuration.

In an embodiment, each fluid channel 60 has a diameter, D, as shown in FIG. 10. In an embodiment, each fluid channel 60 has a diameter, D, from 250 μm, or 300 μm, or 350 μm, or 375 μm, or 380 μm to 385 μm, or 390 μm, or 400 μm, or 450 μm, or 500 μm, or 550 μm, or 600 μm, or 650 μm, or 700 μm, or 750 μm, or 800 μm, or 850 μm, or 900 μm, or 1000 μm. In an embodiment, each fluid channel 60 has a diameter, D, of 381 μm.

The plurality of nozzles 58 are located between the plurality of film channels 38.

In an embodiment, the die assembly 10 includes from 5, or 10, or 15, or 20, or 50, or 100, or 200, or 300, or 400, or 500 to 600, or 700, or 800, or 900, or 1000 nozzles 58. In an embodiment, the die assembly 10 includes 532 nozzles 58.

Figure 13:
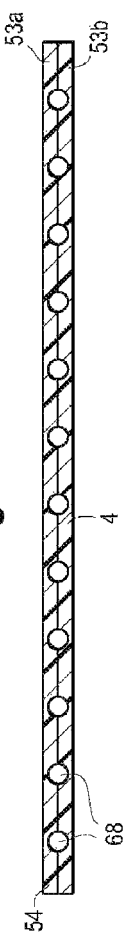
FIG. 13 is a front plan view of a microcapillary film in accordance with an embodiment of the present disclosure.

The plurality of nozzles 58 are operatively connected to a source of channel fluid 66 for emitting the channel fluid 66 between layers of the microcapillary film 54, whereby a plurality of microcapillary channels 68 are formed in the microcapillary film 54, as shown in FIGS. 9 and 13. In an embodiment, the channel fluid 66 is air or a gas. In another embodiment, the channel fluid 66 is a melted thermoplastic material that is different than the melted thermoplastic material 4 flowing through the extruder 2 and the film channels 38. The channel fluid 66 that is a melted thermoplastic material and the melted thermoplastic material 4 flowing through the extruder 2 and the film channels 38 may differ in composition, structure, and/or properties.

FIG. 8 shows the plurality of nozzles 58 are connected to the manifold 36. In an embodiment, the plurality of nozzles 58 are connected to the manifold 36 via a plurality of fasteners 50.

The elongate outlet 52 may comprise two or more embodiments disclosed herein.

The plurality of nozzles 58 may comprise two or more embodiments disclosed herein.

F. Adjustment Mounting Brackets

In an embodiment, the present die assembly includes a first adjustment mounting bracket 70 and a second adjustment mounting bracket 72 positioned on opposite sides of the manifold 36, as shown in FIG. 2. An "adjustment mounting bracket" is an elongated rigid structure to which adjustment assemblies 90 are secured.

The pair of adjustment mounting brackets includes the first adjustment mounting bracket 70 and the second adjustment mounting bracket 72, as shown in FIGS. 1, 2 and 4.

Each adjustment mounting bracket (70, 72) has an outer surface 76 and an inner surface 78, as shown in FIG. 3. The inner surface 78 of the adjustment mounting bracket (70, 72) is in connection with the outer surface of the die plate (12, 28).

A plurality of adjustment mounting bracket adjustment openings 74 extend through each adjustment mounting bracket (70, 72), as shown in FIG. 3. Each adjustment mounting bracket adjustment opening 74 extends from the outer surface 76 of the adjustment mounting bracket (70, 72) to the inner surface 78 of the adjustment mounting bracket (70, 72).

In an embodiment, each adjustment mounting bracket adjustment opening 74 is parallel to one another. FIGS. 2 and 8 depict parallel adjustment mounting bracket adjustment openings 74.

In an embodiment, each adjustment mounting bracket adjustment opening 74 extends at an angle, J, from the inner surface 78 of the adjustment mounting bracket (70, 72), as shown in FIG. 3. In an embodiment, the angle, J, between the inner surface 78 of the adjustment mounting bracket (70, 72) and the adjustment mounting bracket adjustment opening 74 is from 20°, or 25° to 30°, or 35°, or 40°, or 45°, or 50°, or 60°, or 70°, or 80°, or 90°. In an embodiment, the angle, J, between the inner surface 78 of the adjustment mounting bracket (70, 72) and the adjustment mounting bracket adjustment opening 74 is 30°. The angle, G, between the inner surface 20 of the die plate (12, 28) and the adjustment opening 24 is the same as the angle, J, between the inner surface 78 of the adjustment mounting bracket (70, 72) and the adjustment mounting bracket adjustment opening 74.

Each adjustment mounting bracket adjustment opening 74 is positioned to align with an adjustment opening 42 in a die plate (12, 28), such that an adjustment assembly may extend through a adjustment mounting bracket (70, 72) and a die plate (12, 28), as shown in FIG. 2.

Each adjustment mounting bracket (70, 72) and each die plate (12, 28) includes the same number of adjustment openings (42, 74). In an embodiment, each adjustment mounting bracket (70, 72) includes ten restrictor bar adjustment openings 74.

The first adjustment mounting bracket 70 and the second adjustment mounting bracket 72 may comprise two or more embodiments disclosed herein.

G. Adjustment Plates

In an embodiment, the present die assembly 10 includes a first adjustment plate 80 and a second adjustment plate 82 connected to the outer surface 76 of each adjustment mounting bracket (70, 72), as shown in FIG. 2. An "adjustment plate" is an elongated rigid structure sized to be positioned on and connected to the outer surface of a restrictor bar. The adjustment plate enables manipulation of the adjustment assemblies to pull or push on a restrictor bar, thereby adjusting the profile of the flow of the melted thermoplastic material. The adjustment plate (80, 82) also enables a smooth transition along the restrictor bar (92, 93) to create a parabolic profile for adjusting the thickness of the film channel 38 between the manifold 36 and the die plates (12, 28).

The pair of adjustment plates includes the first adjustment plate 80 and the second adjustment plate 82, as shown in FIGS. 1, 2 and 4.

Each adjustment plate (80, 82) has an outer surface 86 and an inner surface 88, as shown in FIG. 3. The inner surface 88 of the adjustment plate (80, 82) is in connection with the outer surface 76 of the adjustment mounting bracket (70, 72).

A plurality of adjustment plate adjustment openings 84 extend through each adjustment plate (80, 82), as shown in FIG. 3. Each adjustment plate adjustment opening 84 extends from the outer surface 86 of the adjustment plate (80, 82) to the inner surface 88 of the adjustment plate (80, 82).

In an embodiment, each adjustment plate adjustment opening 84 is parallel to one another. FIGS. 2 and 8 depict parallel adjustment plate adjustment openings 84.

In an embodiment, each adjustment plate adjustment opening 84 extends at an angle, K, from the inner surface 88 of the adjustment plate (80, 82), as shown in FIG. 3. In an embodiment, the angle, K, between the inner surface 88 of the adjustment plate (80, 82) and the adjustment plate adjustment opening 84 is from 20°, or 25° to 30°, or 35°, or 40°, or 45°, or 50°, or 60°, or 70°, or 80°, or 90°. In an embodiment, the angle, K, between the inner surface 88 of the adjustment plate (80, 82) and the adjustment plate adjustment opening 84 is 30°. The angle, K, between the inner surface 88 of the adjustment plate (80, 82) and the adjustment plate adjustment opening 84 is the same as the angle, G, between the inner surface 20 of the die plate (12, 28) and the adjustment opening 24, which is the same as the angle, J, between the inner surface 78 of the adjustment mounting bracket (70, 72) and the adjustment mounting bracket adjustment opening 74.

Each adjustment plate adjustment opening 84 is positioned to align with a adjustment mounting bracket adjustment opening 74 in an adjustment mounting bracket (70, 72) and an adjustment opening 42 in a die plate (12, 28), such that an adjustment assembly may extend through an adjustment plate (80, 82), an adjustment mounting bracket (70, 72), and a die plate (12, 28), as shown in FIG. 2.

Each adjustment plate (80, 82), each adjustment mounting bracket (70, 72), and each die plate (12, 28) includes the same number of adjustment openings (42, 74, 84). In an embodiment, each adjustment plate (80, 82) includes ten adjustment plate adjustment openings 84.

The first adjustment plate 80 and the second adjustment plate 82 may comprise two or more embodiments disclosed herein.

H. Adjustment Assemblies

In an embodiment, the present die assembly 10 includes a plurality of adjustment assemblies 90. An "adjustment assembly" is an apparatus that applies variable pressure on the first restrictor bar 92 or the second restrictor bar 93, and thereby on a respective die plate (12, 28). A nonlimiting example of a suitable adjustment assembly 90 is depicted in FIGS. 1, 2 and 3.

By tightening one or more adjustment assemblies 90, the pressure applied to a die plate (12, 28) may be increased along the width, W, of the die plate (12, 28). Additionally, pressure may be adjusted at a fine level along the width, W, of the die plate (12, 28) such that pressure may be increased in areas known to exhibit the most vertical deformation (e.g, the middle-most point along the width, W, of the die plate (12, 28)), relative to other points along the width, W, of the die plate (12, 28). Bounded by no particular theory, it is believed that increasing pressure at the middle-most point along the width, W, of the die plate (12, 28) with the adjustment assemblies 90 results in increased flow of the thermoplastic material 4 towards the first end 102 and the second end 104 of the die assembly, as shown in FIG. 1. This is believed to result in a more homogenized flow of thermoplastic material 4 through the die assembly 10 and, in turn, in a film with less variation in thickness.

In an embodiment, the adjustment assemblies 90 are connected to a first restrictor bar 92 or a second restrictor bar 93, as shown in FIGS. 2 and 3. A "restrictor bar" is an elongated structure operably connected to one or more adjustment assemblies and positioned within a die plate. The restrictor bar (92, 93) extends along a portion of the width, W, of the die plate (12, 28). In other words, the restrictor bar (92, 93) does not extend the entire width, W, of the die plate (12, 28). The restrictor bar (92, 93) bends, or deforms, due to the application of pressure by one or more adjustment assemblies 90. The restrictor bar (92, 93) can be deformed, or bent, its full length using the adjustment assemblies 90 to alter the thickness of the area of the film channel 38 between the restrictor bar (92, 93) and the manifold 36 (e.g., to reduce flow of melted thermoplastic material in the center of the die assembly by tightening the center adjustment assemblies and not the outside adjustment assemblies).

The number of adjustment assemblies 90 is equal to the combined number of adjustment openings (42, 74, 84) in each adjustment plate (80, 82), or in each adjustment mounting bracket (70, 72), or in each die plate (12, 28). In an embodiment, the die assembly 10 includes twenty adjustment assemblies 90.

The adjustment assembly 90 may comprise two or more embodiments disclosed herein.

I. Cartridge Heaters

In an embodiment, the present die assembly 10 includes a plurality of cartridge heaters 100. A "cartridge heater" is a cylindrical heating element.

In an embodiment, the first die plate 12 includes a plurality of cartridge heaters 100.

In an embodiment, the second die plate 28 includes a plurality of cartridge heaters 100.

Each cartridge heater 100 is positioned within, or substantially within, a cartridge heater opening 26 in a die plate (12, 28), as shown in FIG. 4.

The number of cartridge heaters 100 is equal to the combined number of cartridge heater opening 26 in the first die plate 12 and the second die plate 28. In an embodiment, the die assembly 10 includes 24 cartridge heaters 100.

Each cartridge heater 100 is electrically connected to a power source and a controller (not shown). Each cartridge heater 100 may be set at the same temperature, or at a different temperature.

Bounded by no particular theory, it is believed that the use of cartridge heaters 100 placed within, or substantially within, a die plate (12, 28) allows for more efficient heating of the die assembly and better control over the temperature of the die assembly compared to die assemblies that utilize an external heating source. Additionally, the cartridge heaters 100 allow the die assembly 10 to include multiple heating zones, with each zone set at a different temperature.

The cartridge heaters 100 may comprise two or more embodiments disclosed herein.

J. Mounting Plate

In an embodiment, the present die assembly 10 includes a mounting plate 94, as shown in FIG. 1. A "mounting plate" is a structure connected to the first die plate and the second die plate, to which an extruder may be connected.

In an embodiment, the mounting plate is connected to the first die plate 12 and the second die plate 28 with a plurality of fasteners 50.

K. Hoist Arm and Hoist Ring

In an embodiment, the present die assembly 10 includes a plurality of hoist arms 96 connected to the outer surface 18 of the die plate (12, 28), as shown in FIGS. 1 and 2. The hoist arms 96 are connected to hoist rings 98. A "hoist ring" is a structure that facilitates the connection of the present die assembly 10 with an extruder 2.

L. Microcapillary Film

FIG. 13 shows the microcapillary film 54 formed by the present die assembly 10 containing a plurality of microcapillary channels 68 extending therethough. The microcapillary film 54 includes a number of microcapillary channels 68 that is equal to the number of nozzles 58 of the die assembly 10.

The microcapillary film 54 has a width, B, as shown in FIG. 13. In an embodiment, the width, B, of the microcapillary film 54 is less than, or equal to, the width, M, of the elongate outlet 52. In an embodiment, the width, B, of the microcapillary film 54 is from 50 cm, or 55 cm, or 56 cm, or 57 cm, or 58 cm, or 59 cm, or 60 cm to 61 cm, or 62 cm, or 63 cm, or 64 cm, or 65 cm, or 70 cm. In an embodiment, the width, B, of the microcapillary film 54 is 60.96 cm (24 inches).

The microcapillary film 54 has a thickness, C, as shown in FIG. 13. In an embodiment, the maximum thickness, C, of the microcapillary film 54 is from 25.4 µm, or 40 µm, or 45 µm to 46 µm, or 50 µm, or 55 µm, or 60 µm, or 70 µm, or 80 µm, or 100 µm, or 150 µm, or 200 µm, or 500 µm, or 1000 µm, or 1500 µm, or 1524 µm, or 1600 µm. In an embodiment, the maximum thickness, C, of the microcapillary film 54 is 45.72 µm (1.8 mil).

In an embodiment, the variation of film thickness of the microcapillary film 54 across its width, B, is less than ±10%, or less than ±5%. In an embodiment, the variation of thickness of the microcapillary film is from −10%, or −5% to 2%, or 3%, or 4%, or 5%, or 10%. Variation in film thickness is calculated in accordance with the following Equations 1 and 2.

$$\text{upper limit variation in film thickness} = \frac{\text{maximum film thickness} - \text{average film thickness}}{\text{average film thickness}} \times 100 \quad \text{Equation 1}$$

$$\text{lower limit variation in film thickness} = \frac{\text{minimum film thickness} - \text{average film thickness}}{\text{average film thickness}} \times 100 \quad \text{Equation 2}$$

wherein average film thickness is the mean average of thickness values measured across the width, B, of the microcapillary film 54; maximum film thickness is the maximum thickness value measured across the width, B, of the microcapillary film 54; and minimum film thickness is the minimum thickness value measured across the width, B, of the microcapillary film 54.

In an embodiment, the upper limit variation in film thickness is from 0%, or 0.1% to 1.4%, or 1.5%, or 2.0%, or 3.0%, or 4.0%, or 5.0%, or 6.0%, or 7.0%, or 8.0%, or 9.0%, or 10.0%.

In an embodiment, the lower limit variation in film thickness is from −10.0%, or −9.0%, or −8.0%, or −7.0%, or −6.0%, or −5.0%, or −4.5%, or −4.2% to −4.0%, or −3.0%, or −2.0%, or −1.0%, or −0.5%, or −0.1%, or 0%.

In an embodiment, the microcapillary film 54 is a multi-layer film. The multilayer film contains two layers, or more than two layers. For example, the multilayer film can have two, three, four, five, six, seven, eight, nine, ten, eleven, or more layers. In an embodiment, the multilayer film contains only two layers, or only three layers. FIG. 13 depicts a microcapillary film 54 that is a multilayer film with two layers, including a first layer 53a and a second layer 53b. The microcapillary channels 68 are located between the first layer 53a and the second layer 53b.

In an embodiment, the die assembly 10 includes:
a first die plate 12 and a second die plate 28, the first die plate 12 and the second die plate 28 each containing a plurality of cartridge heaters 100;
a plurality of multi-jackbolt tensioners 30 connecting the first die plate 12 to the second die plate 28;
a manifold 36 located between the pair of die plates (12, 28) and defining a plurality of film channels 38 therebetween, the plurality of film channels 38 converging into an elongate outlet 52, the thermoplastic material 4 extrudable through the plurality of film channels 38 and the elongate outlet 52 to form a microcapillary film 54;
a first adjustment mounting bracket 70 and a second adjustment mounting bracket 72 positioned on opposite sides of the manifold 36;
a plurality of adjustment assemblies 90 in contact with each adjustment mounting bracket (70, 72), wherein each adjustment assembly 90 is capable of applying a pressure on a first restrictor bar 92 or a second restrictor bar 93;
a plurality of nozzles 58 located between the plurality of film channels 38, the plurality of nozzles 58 operatively connected to a source of channel fluid 66 for emitting the channel fluid 66 between layers of the microcapillary film 54 whereby a plurality of microcapillary channels 68 are formed in the microcapillary film 54; and the microcapillary film 54 has a variation of thickness of ±10%, or ±5%, or ±4.2%; or from −10%, or −5% to 2%, or 3%, or 4%, or 5%, or 10%.

The die assembly 10 may comprise two or more embodiments disclosed herein.

While the present disclosure is directed to a microcapillary film 54 that is a multilayer film with two layers, each layer formed from the same thermoplastic material 4, it is understood that each layer may alternatively be formed from a different thermoplastic material 4, the thermoplastic materials differing in composition, structure, and/or properties.

In an embodiment, the die assembly is operatively connected to a plurality (e.g., 2) of extruders, each extruder having a thermoplastic material passing therethrough. The die assembly includes a manifold spacer with a plurality (e.g., 2) of manifold spacer intakes and a corresponding number of manifold spacer outtakes; a manifold with a plurality (e.g., 2) of manifold intakes and a corresponding number of manifold outtakes; and a plurality of film channels (e.g., 2). In an embodiment, a first thermoplastic material flows through the first extruder into the first manifold spacer intake and out the first manifold spacer outtake, into the first manifold intake and out the first manifold outtake, into the first film channel. In an embodiment, a second thermoplastic material flows through the second extruder into the second manifold spacer intake and out the second manifold spacer outtake, into the second manifold intake and out the second manifold outtake, into the second film channel. The first film channel and the second film channel converge into an elongate outlet, the first thermoplastic material and the second thermoplastic material extrudable through the respective first film channel and second film channel, and the elongate outlet to form a microcapillary film.

By way of example, and not limitation, examples of the present disclosure are provided.

EXAMPLE

The die assembly 10 of FIGS. 1-7, 11, and 12 is provided. The die assembly 10 is operatively connected to (i.e., is in fluid communication with) an extruder 2 having a thermoplastic material 4 passing therethrough. The thermoplastic material 4 is Dow™ LDPE 501I (a LDPE with a density of 0.922 g/cc and a melt index of 1.9 g/10 min). The extruder 2 is a 1.25-inch (3.175 cm) diameter Killion single-screw extruder that feed a gear pump operated at a speed commensurate with the desired output rate (here, the gear pump speed is 50 rotations per minute). While the present example utilizes a gear pump, it is understood that a gear pump is not required to produce a microcapillary film with the present die assembly. The extrusion temperature is 200° C. and the air flow rate is 150 ml/min. the line speed is 59.2 ft/min (18.0 meters/min).

The die assembly 10 includes a first die plate 12, a second die plate 28, twelve SUPERBOLT™ bolt-style S8 multi-jackbolt tensioners (available from Nord-Lock, Inc) connecting the first die plate 12 to the second die plate 28, a manifold 36, and a plurality of nozzles 58. The manifold 36 is located between the pair of die plates (12, 28) and defines a plurality of film channels 38 therebetween. The plurality of film channels 38 converge into an elongate outlet 52, the thermoplastic material 4 extrudable through the plurality of film channels 38 and the elongate outlet 52 to form a microcapillary film 54. The plurality of nozzles 58 are located between the plurality of film channels 38. The plurality of nozzles 58 are operatively connected to a source of channel fluid 66 for emitting the channel fluid 66 between layers of the microcapillary film 54, whereby a plurality of microcapillary channels 68 are formed in the microcapillary film 54.

A first adjustment mounting bracket 70 and a second adjustment mounting bracket 72 are positioned on opposite sides of the manifold 36. Ten adjustment assemblies 90 are in contact with each adjustment mounting bracket (70, 72). The ten adjustment assemblies 90 in contact with the first adjustment mounting bracket 70 are capable of applying pressure on the first restrictor bar 92 positioned within the first die plate 12. The ten adjustment assemblies 90 in contact with the second adjustment mounting bracket 72 are capable of applying pressure on the second restrictor bar 93 within the second die plate 28.

Each die plate (12, 28) has a width, W, of 86.36 cm (34 inches); a thickness, T, of 11.43 cm (4.5 inches), and a height, H, of 25.4 cm (10 inches).

The elongate outlet 52 has a width, M, of 60.96 cm (24 inches).

The die assembly 10 includes 532 nozzles 58. Each nozzle 58 has a fluid channel 60 with a diameter, D, of 381 µm.

The die assembly 10 produces an example microcapillary film 54 with a width, B, of 60.96 cm (24 inches). The example microcapillary film 54 includes 532 microcapillary channels 68.

The thickness, C, of the example microcapillary film 54 is measured in 2.54 cm (1 inch) increments from the left side of the microcapillary film to the right side of the microcapillary film. The results are reported in Table 1, and depicted in FIGS. 14 and 15.

TABLE 1

| Segment Number | Measurement Distance from Left Side of Microcapillary Film (cm) | Example Microcapillary Film Thickness (µm) |
| --- | --- | --- |
| 1 | 2.54 | 45.72 |
| 2 | 5.08 | 45.72 |
| 3 | 7.62 | 45.72 |
| 4 | 10.16 | 45.72 |
| 5 | 12.70 | 45.72 |
| 6 | 15.24 | 45.72 |
| 7 | 17.78 | 45.72 |
| 8 | 20.32 | 45.72 |
| 9 | 22.86 | 45.72 |

TABLE 1-continued

| Segment Number | Measurement Distance from Left Side of Microcapillary Film (cm) | Example Microcapillary Film Thickness (µm) |
| --- | --- | --- |
| 10 | 25.40 | 43.18 |
| 11 | 27.94 | 43.18 |
| 12 | 30.48 | 45.72 |
| 13 | 33.02 | 43.18 |
| 14 | 35.56 | 45.72 |
| 15 | 38.10 | 45.72 |
| 16 | 40.64 | 45.72 |
| 17 | 43.18 | 43.18 |
| 18 | 45.72 | 45.72 |
| 19 | 48.26 | 43.18 |
| 20 | 50.8 | 45.72 |

The example microcapillary film 54 has a variation in film thickness ranging from −4.2% to 1.4%, as determined in accordance with Equations 1 and 2:

$$\text{upper limit variation in film thickness} = \frac{\text{maximum film thickness} - \text{average film thickness}}{\text{average film thickness}} \times 100 \quad \text{Equation 1}$$

$$\text{lower limit variation in film thickness} = \frac{\text{minimum film thickness} - \text{average film thickness}}{\text{average film thickness}} \times 100 \quad \text{Equation 2}$$

For the example microcapillary film 54, the maximum film thickness is 45.72 µm (1.8 mil); the minimum film thickness is 43.18 µm (1.7 mil); and the average film thickness is 45.09 µm (1.775 mil) in Equations 1 and 2. According to Equation 1, the upper limit variation in film thickness is 1.4%. According to Equation 2, the lower limit variation in film thickness is −4.2%. Thus, the example microcapillary film 54 has a variation of thickness of ±4.2%.

Applicant surprisingly found that the present die assembly 10 forms a microcapillary film 54 that is thin (maximum thickness of 45.72 µm (1.8 mil)) and exhibits a low variation of film thickness (ranging from −4.2% to 1.4%).

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A die assembly comprising:
a first die plate and a second die plate;
a plurality of multi-jackbolt tensioners connecting the first die plate to the second die plate, each multi-jackbolt tensioner includes a bolt body coupled to a main bolt, a plurality of jackbolts, and a washer, the plurality of jackbolts axially arranged around a circumference of the bolt body;
a manifold located between the pair of die plates and defining a plurality of film channels therebetween, the plurality of film channels converging into an elongate outlet, wherein a thermoplastic material is extrudable through the plurality of film channels and the elongate outlet to form a microcapillary film; and
a plurality of nozzles located between the plurality of film channels, the plurality of nozzles operatively connected to a source of channel fluid for emitting the channel fluid between layers of the microcapillary film whereby a plurality of microcapillary channels are formed in the microcapillary film.

2. The die assembly of claim 1 further comprising a first adjustment mounting bracket and a second adjustment mounting bracket positioned on opposite sides of the manifold.

3. The die assembly of claim 2 further comprising a plurality of adjustment assemblies in contact with each adjustment mounting bracket, wherein each adjustment assembly is capable of applying a pressure on a first restrictor bar or a second restrictor bar positioned within the respective first die plate and second die plate.

4. The die assembly of claim 1, wherein the first die plate comprises a plurality of cartridge heaters.

5. The die assembly of claim 1, wherein the second die plate comprises a plurality of cartridge heaters.

6. The die assembly of claim 1, wherein the microcapillary film has a variation of thickness from −10% to 10%.

7. The die assembly of claim 1, wherein the die assembly is operatively connected to an extruder.

8. The die assembly of claim 1, wherein the bolt body includes threads that are configured to engage with the main bolt to couple the bolt body to the main bolt.

9. The die assembly of claim 8, wherein the main bolt extends through the bolt body.

10. The die assembly of claim 8, wherein the main bolt is configured to threadingly engage with the second die plate, and the washer contacts an outer surface of the first die plate, and the multi-jackbolt tensioner connects the first die plate to the second die plate.

11. The die assembly of claim 1, wherein each jackbolt extends through, and is threadingly engaged with, the bolt body.

12. The die assembly of claim 11, wherein each jackbolt has a first end and a second end, the second end in contact with the washer.

13. The die assembly of claim 12, wherein each jackbolt is rotated in a tightening fashion, such that the second end exerts a force on the washer and separates the bolt body from the washer to form a gap between the bolt body and the washer.

14. The die assembly of claim 13, wherein the bolt body pulls the main bolt as the bolt body separates from the washer, and the multi-jackbolt tensioner connects the first die plate to the second die plate.

15. The die assembly of claim 1, wherein the source of channel fluid is at least one of a gas, and air.

* * * * *